(12) United States Patent
Zhang et al.

(10) Patent No.: US 11,926,188 B2
(45) Date of Patent: Mar. 12, 2024

(54) METHOD AND SYSTEM FOR ADJUSTING HEIGHT AND DAMPING FORCE

(71) Applicant: Airlop (Beijing) Automotive Technology Co., Ltd., Baijing (CN)

(72) Inventors: Xiaofeng Zhang, Beijing (CN); Jia Zhang, Beijing (CN); Guo Sun, Beijing (CN); Manhua Yu, Beijing (CN); Yongjiang Feng, Beijing (CN)

(73) Assignee: Airlop (Beijing) Automotive Technology Co., Lt, Beijing (CN)

( * ) Notice: Subject to any disclaimer, the term of this patent is extended or adjusted under 35 U.S.C. 154(b) by 54 days.

(21) Appl. No.: 17/769,857

(22) PCT Filed: Oct. 19, 2020

(86) PCT No.: PCT/CN2020/122009
§ 371 (c)(1),
(2) Date: Apr. 18, 2022

(87) PCT Pub. No.: WO2021/073653
PCT Pub. Date: Apr. 22, 2021

(65) Prior Publication Data
US 2022/0388363 A1 Dec. 8, 2022

(30) Foreign Application Priority Data
Oct. 18, 2019 (CN) .......................... 201910991448.7

(51) Int. Cl.
*B60G 17/052* (2006.01)
*B60G 17/06* (2006.01)

(52) U.S. Cl.
CPC ......... *B60G 17/0525* (2013.01); *B60G 17/06* (2013.01)

(58) Field of Classification Search
CPC ............................. B60G 17/0525; B60G 17/06
See application file for complete search history.

(56) References Cited

U.S. PATENT DOCUMENTS 6,055,471 A * 4/2000 Ohsaku ................ B60G 17/015
248/550
6,070,681 A * 6/2000 Catanzarite ........ B62D 33/0608
180/89.15
(Continued)

FOREIGN PATENT DOCUMENTS

CN 102180116 A 9/2011
CN 202914611 U 5/2013
(Continued)

OTHER PUBLICATIONS

Written Opinion of the ISA from PCT/CN2020/122009.
(Continued)

*Primary Examiner* — Toan C To
(74) *Attorney, Agent, or Firm* — James E. Walton

(57) ABSTRACT

A method and system for adjusting height and damping force, the method comprising: between a first connection part (110) and a second connection part (120), arranging a pneumatic valve (130), an air spring (140), an adjustable damper (150) and a damping force adjustment device (160) used for adjusting the damping force of an adjustable damper (150), the positions of the pneumatic valve (130), the air spring (140), the adjustable damper (150) and the damping force adjustment device (160) being adaptive and the pneumatic valve (130) being connected to the damping force adjustment device (160) and the air spring (140), respectively; the pneumatic valve (130) collects at least one movement variable of the first connection part (110) relative to the second connection part (120); meanwhile, the pneumatic valve (130), according to the collected movement variable and/or the change in the movement variable, controlling the air spring (140) to inflate or deflate so as to implement height adjustment; and/or carrying out gas driving on the damping force adjustment device (160) to control the adjustable damper (150) to output corresponding damp-
(Continued)

ing force, so as to adjust the size of the damping force of the adjustable damper (150), which improves the sensitivity of height adjustment and damping force adjustment.

21 Claims, 4 Drawing Sheets

(56) References Cited

U.S. PATENT DOCUMENTS

| | | | | |
|---|---|---|---|---|
| 6,427,986 B1* | 8/2002 | Sakai | ................ | B60G 17/0416 |
| | | | | 188/282.4 |
| 8,113,521 B2* | 2/2012 | Lin | ................ | B60G 17/018 |
| | | | | 280/5.514 |
| 8,682,530 B2* | 3/2014 | Nakamura | ................ | B60G 13/16 |
| | | | | 280/124.108 |
| 10,569,813 B2* | 2/2020 | Davis | ................ | B60G 17/016 |
| 11,110,913 B2* | 9/2021 | Krosschell | ................ | B60G 17/0162 |
| 2004/0094912 A1* | 5/2004 | Niwa | ................ | B60G 17/0165 |
| | | | | 280/5.518 |
| 2006/0226587 A1* | 10/2006 | Sendrea | ................ | B60G 17/08 |
| | | | | 267/64.28 |
| 2010/0230876 A1* | 9/2010 | Inoue | ................ | B60G 13/14 |
| | | | | 267/140.14 |
| 2010/0237656 A1* | 9/2010 | Haller | ................ | B62D 33/0608 |
| | | | | 296/190.07 |
| 2019/0111753 A1* | 4/2019 | Reuter | ................ | B60G 17/0155 |
| 2019/0168565 A1* | 6/2019 | Dolan | ................ | B60G 17/0525 |
| 2020/0016953 A1* | 1/2020 | Oakden-Graus | ................ | B60G 3/20 |

FOREIGN PATENT DOCUMENTS

| | | |
|---|---|---|
| CN | 103660832 A | 3/2014 |
| CN | 105492225 A | 4/2016 |
| CN | 106080084 A | 11/2016 |
| CN | 110712492 A | 1/2020 |
| CN | 110745044 A | 2/2020 |
| JP | 2005291413 A | 10/2005 |
| UA | 64036 C2 | 2/2004 |

OTHER PUBLICATIONS

International Search Report dated Jan. 18, 2021 for Parent PCT Appl. No. PCT/CN2020/122009.
First Office Action from Chinese Appl. No. 201910991448.7.
First Search Report from Chinese Appl. No. 201910991448.7.
Second Office Action from from Chinese Appl. No. 201910991448.7.
Supplemental Search from Chinese Appl. No. 201910991448.7.

* cited by examiner

METHOD AND SYSTEM FOR ADJUSTING HEIGHT AND DAMPING FORCE

CROSS REFERENCE TO RELATED APPLICATION

This application is a 35 U.S.C. § 371 National-Stage application based upon PCT/CN2020/122009, titled "Method and System for Adjusting Height and Damping Force," filed 19 Oct. 2020, which claims priority to Chinese Patent Application No. 201910991448.7, titled "Method and System for Adjusting Height and Damping Force," filed 18 Oct. 2019, both of which are incorporated herein by reference for all purposes.

The present application claims the priority of the Chinese patent application with the application number of 201910991448.7 and titled "Method and System for Adjusting Height and Damping Force" filed with the China Patent Office on Oct. 18, 2019, the entire contents of which are incorporated by reference in the present application.

TECHNICAL FIELD

The present invention relates to the field of shock absorbers, in particular to a method and system for adjusting height and damping force.

BACKGROUND

The existing suspension system mainly includes two control systems for height adjustment and damping force adjustment. These two control systems are mutually independent systems and have corresponding control mechanisms respectively. In a manner of manual adjustment, it is necessary to press two buttons at the same time to realize synchronous adjustment of the two control systems, which is inconvenient to operate. In a manner of electrical controlling, a suspension control system based on a CDC damper (CDC, Continuous Damping Control) is more commonly used. The suspension control system first uses sensors to collect information, and sends the collected information to an electronic control unit. The electronic control unit calculates air pressure inside the airbag of the air spring and damping force of the damper at the same time, and sends the calculated control signal to the air spring and the CDC damper at the same time, and controls the air spring and the CDC damper to perform a corresponding operation at the same time, thereby realize height adjustment and shock absorbing adjustment of the suspension system. Although this suspension control system can improve stability and comfort of the suspension system, electronic elements in the suspension control system are vulnerable to limitation by installation position in the actual application process, which makes the control accuracy not accurate enough and the installation and maintenance inconvenient; in addition, the electronic elements are vulnerable to limitation by space of the suspension system itself in terms of circuit layout, and the cost of the suspension control system is relatively high, so that the suspension control system is not widely used.

SUMMARY

In view of the above problems, the present invention is proposed so as to provide a method and system for adjusting height and damping force that overcomes the above problems or at least partially solves the above problems.

According to an aspect of the present invention, a method for adjusting height and damping force is provided, which includes: arranging a pneumatic valve, an air spring, an adjustable damper and a damping force adjustment device configured to adjust the damping force of the adjustable damper between a first connection part and a second connection part, wherein the positions of the pneumatic valve, the air spring, the adjustable damper and the damping force adjustment device fit with each other, and the pneumatic valve is connected to the damping force adjustment device and the air spring, respectively;

collecting, by the pneumatic valve, at least one movement variable of the first connection part relative to the second connection part;

controlling, by the pneumatic valve, the air spring to inflate or deflate according to at least one of the collected movement variable and change in the movement variable, so as to realize height adjustment; and/or carrying out gas driving on the damping force adjustment device to control the adjustable damper to output corresponding damping force, so as to realize adjustment of size of the damping force of the adjustable damper.

According to another aspect of the present invention, a system for adjusting height and damping force is provided, which includes a first connection part, a second connection part, at least one pneumatic valve, an air spring, an adjustable damper and a damping force adjustment device configured to adjust the damping force of the adjustable damper; the pneumatic valve, the air spring, the adjustable damper and the damping force adjustment device is arranged between a first connection part and a second connection part; the positions of the pneumatic valve, the air spring, the adjustable damper and the damping force adjustment device fit with each other; and the pneumatic valve is connected to the damping force adjustment device and the air spring, respectively;

the pneumatic valve is configured to collect at least one movement variable of the first connection part relative to the second connection part, and meanwhile, according to at least one of the collected movement variable and the change in the movement variable, to control the air spring to inflate or deflate so as to realize height adjustment, and/or carry out gas driving on the damping force adjustment device to control the adjustable damper to output corresponding damping force, so as to realize adjustment of the size of the damping force of the adjustable damper.

The beneficial effects of the present invention are as follows: in the technical solution of the present invention, by collecting at least one movement variable of the first connection part relative to the second connection part by the pneumatic valve, and directly carrying out gas driving on the adjustment device by the pneumatic valve to adjust the size of the damping force of the damper, and meanwhile directly controlling the air spring to inflate or deflate by the pneumatic valve to adjust the height, synchronous adjustment of height and damping force is realized through coordinative cooperation of the mechanical mechanisms, which, compared with realization of synchronous adjustment of height and damping force in a manner of electric control in the prior art, improves sensitivity of height adjustment and shock absorption adjustment, and further improves comfort level. In addition, the technical solution of the present invention makes it unnecessary for the driver to manually adjust the damping force and the height in the process of driving, so that the driver's attention is more concentrated and occurrence of traffic accidents can be reduced to a certain extent.

The above description is only an overview of the technical solutions of the present invention. In order to enable clearer understanding of the technical means of the present invention, so as to be able to be implemented in accordance with the contents of the description, and in order to make the above and other objects, features and advantages of the present invention more comprehensible, specific embodiments of the present invention are enumerated below.

BRIEF DESCRIPTION OF THE DRAWINGS

Various other advantages and benefits will become apparent to those ordinary skilled in the art upon reading the following detailed description of the preferred embodiments below. The drawings are only for the purpose of illustrating the preferred embodiments, and are not to be considered as limiting the present invention. Moreover, the same components are denoted with the same reference numerals throughout the drawings. In the drawings.

DESCRIPTION OF THE DRAWINGS

Figure 1:
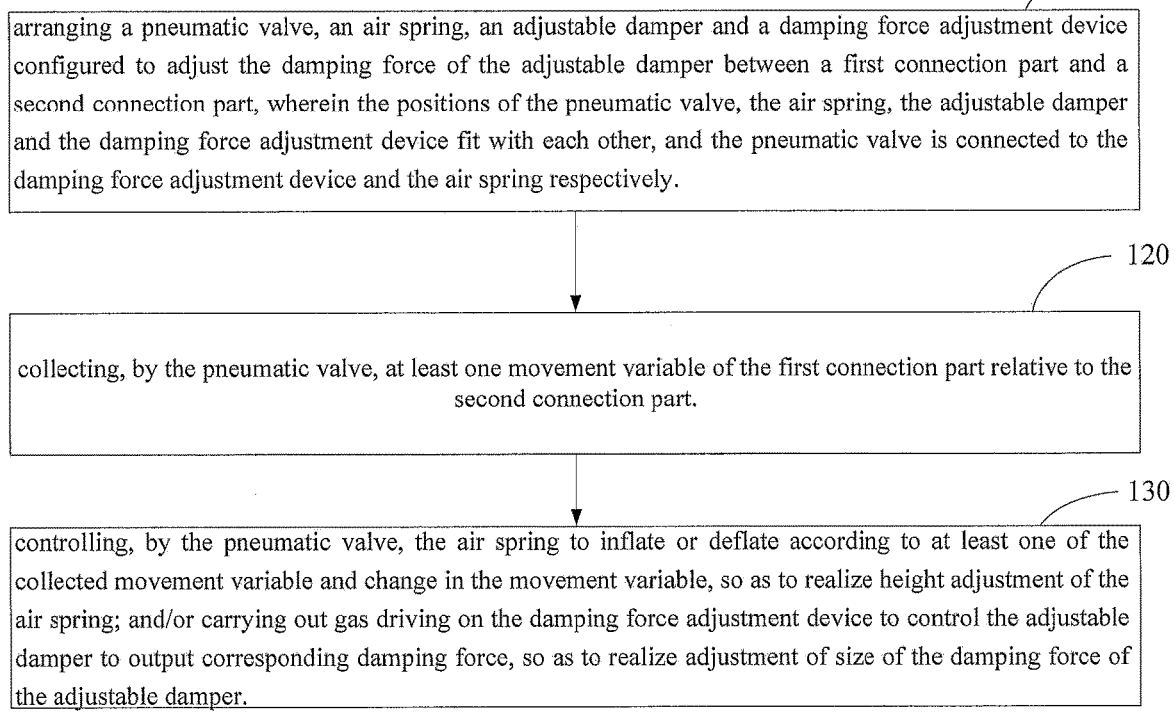
FIG. 1 shows a flow chart of a method for adjusting height and damping force according to an embodiment of the present invention.

S00, total working stroke balance position; S11, lower limit of first displacement threshold range; S12, upper limit of first displacement threshold range; S21, lower limit of second displacement threshold range; S22, upper limit of second displacement threshold range; S31, lower limit of third displacement threshold range; S32, upper limit of third displacement threshold range; 100, system for adjusting damping force of damper; 110, first connection part; 120, second connection part; 130, pneumatic valve; 140, air spring; 150, adjustable damper; 160, damping force adjustment device; 170, height adjustment device; 161, gas compression device; 162, cable control device; 163, gas compression device; 164, proportional valve.

DETAILED DESCRIPTION

Exemplary embodiments of the present invention will be described in more detail below with reference to the drawings. Although the exemplary embodiments of the present invention are shown in the drawings, it should be understood that the present invention can be implemented in various forms and should not be limited by the embodiments set forth herein. On the contrary, these embodiments are provided in order to enable a thorough understanding of the present invention, and to enable a full conveyance of the scope of the present invention to those skilled in the art.

FIG. 1 shows a flow chart of a method for adjusting height and damping force according to an embodiment of the present invention. As shown in FIG. 1, the method for adjusting height and damping force includes the following steps.

In a step S110, a pneumatic valve, an air spring, an adjustable damper and a damping force adjustment device used for adjusting the damping force of the adjustable damper are arranged between a first connection part and a second connection part; the positions of the pneumatic valve, the air spring, the adjustable damper and the damping force adjustment device fit with each other; and the pneumatic valve is connected to the damping force adjustment device and the air spring, respectively. Specifically, a first gas output of the pneumatic valve is connected to a gas input of the damping force adjustment device, and the second gas output of the pneumatic valve is connected to a connection port of the air spring.

In the present step, the pneumatic valve is of a linear structure, the pneumatic valve includes a driving rod and a valve body, the driving rod performs reciprocating linear motion inside the valve body, the driving rod is connected to the first connection part, and the valve body is connected to the second connection part. It should be noted that the present embodiment does not further limit the positions of the pneumatic valve, the air spring and the adjustable damper, as long as the pneumatic valve can collect the movement variable between the first connection part and the second connection part, the air spring can provide support between the first connection part and the second connection part and change the positional relationship between the first connection part and the second connection part, and the adjustable damper can provide shock absorption effect for the first connection part or the second connection part. The damping force adjustment device includes a device for controlling swinging direction and the size of swinging amplitude of the adjustment pin of the adjustable damper. The first gas output of the pneumatic valve is connected to the gas input of the damping force adjustment device for adjusting the damping force of the adjustable damper, so that a gas flow connection can be generated between the pneumatic valve and the damping force adjustment device, wherein in the process of communication of the damping force adjustment device with the pneumatic valve, the damping force adjustment device is also communicated with the atmosphere, so as to realize gas driving by the pneumatic valve on the damping force adjustment device to perform corresponding operations, that is, the pneumatic valve carries out the gas driving on the damping force adjustment device to connect with an air source and the atmosphere and controls the adjustable damper to output a corresponding damping force; the second gas output of the pneumatic valve is connected to the connection port of the air spring, so that a gas flow connection can be generated between the pneumatic valve and the air spring, so that the air spring is enabled to be connected to the air source or the atmospheric, thereby realizing inflation or deflation of the air spring.

In addition, when the first connection part includes a driver's compartment, the second connection part includes a chassis frame, that is, the pneumatic valve, the air spring, the adjustable damper and the damping force adjustment device used for adjusting the damping force of the adjustable damper are arranged between the driver's compartment and the chassis frame. When the first connection part includes a vehicle chassis, the second connection part includes a wheel, that is, the pneumatic valve, the air spring, the adjustable damper and the damping force adjustment device used for adjusting the damping force of the adjustable damper are arranged between the vehicle chassis and the wheel. When the first connection part includes the upper frame of the seat, the second connection part includes the lower frame of the seat, that is, the pneumatic valve, the air spring, the adjustable damper and the damping force adjustment device used for adjusting the damping force of the adjustable damper are arranged between the upper frame of the seat and the lower frame of the seat. When the first connection part includes the sliding horizontal axis of the seat scissor frame, the second connection part includes the rotating pin shaft of the seat scissor frame, that is, the pneumatic valve and the adjustable damper are arranged between the sliding horizontal axis of the seat scissor frame and the rotating pin shaft of the seat scissor frame, and the air spring and the damping force adjustment device used for adjusting the damping force of the adjustable damper are arranged at a corresponding position.

In a step S120, the pneumatic valve collects at least one movement variable of the first connection part relative to the second connection part;

In the present step, the movement variable includes the positional relationship of the first connection part relative to the second connection part, the velocity of the first connection part relative to the second connection part, and the acceleration of the first connection part relative to the second connection part. The present embodiment does not further limit the movement variable.

In a step S130, the pneumatic valve, according to at least one of the collected movement variable and the change in the movement variable, controls the air spring to inflate or deflate so as to realize height adjustment; and/or carries out gas driving on the damping force adjustment device to control the adjustable damper to output corresponding damping force, so as to realize adjustment of the size of the damping force of the adjustable damper.

In the present step, the change of the movement variable is determined through at least two temporally consecutive movement variables of the first connection part relative to the second connection part. After the pneumatic valve collects the movement variable between the first connection part and the second connection part, or after the pneumatic valve collects the change of the movement variable between the first connection part and the second connection part, or after the pneumatic valve collects the movement variable and the change of the movement variable between the first connection part and the second connection part, the gas flow inside the pneumatic valve changes. Because the first gas output of the pneumatic valve is connected to the gas input of the damping force adjustment device used for adjusting the damping force of the adjustable damper, the change of the gas flow inside the pneumatic valve drives the change of the gas flow inside the damping force adjustment device, so that the damping force adjustment device is triggered to control the swinging direction and the size of the swinging amplitude of the adjustment pin of the adjustable damper, so that the adjustable damper outputs the damping force corresponding to the swinging direction and the swinging amplitude, so as to realize the adjustable size of the damping force of the adjustable damper; in addition, while the gas flow inside the pneumatic valve changes, the working stroke of the pneumatic valve changes. Because the second gas output of the pneumatic valve is connected to the connection port of the air spring, when the working stroke of the pneumatic valve changes, the pneumatic valve and the air spring can generate a gas flow connection, so that the air spring is enabled to be connected to the air source or the atmosphere, so as to realize inflation or deflation of the air spring, to realize height adjustment.

As can be known from the above, in the technical solution of the present embodiment, by collecting at least one movement variable of the first connection part relative to the second connection part by the pneumatic valve, and directly carrying out gas driving on the damping force adjustment device by the pneumatic valve to adjust the size of the damping force of the adjustable damper, and meanwhile directly controlling the air spring to inflate or deflate by the pneumatic valve to adjust the height, synchronous adjustment of height and damping force is realized through coordinative cooperation of the mechanical mechanisms, which, compared with realization of synchronous adjustment of height and damping force in a manner of electric control in the prior art, improves sensitivity of height adjustment and shock absorption adjustment, and further improves comfort level. In addition, the technical solution of the present embodiment makes it unnecessary for the driver to manually adjust the damping force and the height in the process of driving, so that the driver's attention is more concentrated and occurrence of traffic accidents can be reduced to a certain extent.

It should be further noted that the adjustable damper in the present embodiment includes a CDC damper and a PDC damper (PDC, Pneumatic Damping Control), etc. The type of the adjustable damper will not be further limited by the present embodiment as long as the damping force of the adjustable damper is adjustable. In addition, the above contents only exemplify the structure of the damping force adjustment device of the adjustable damper, and other adjustment devices that can adjust the damping force of the adjustable damper all fall within the protection scope of the present embodiment.

Figure 2:
FIG. 2 shows a schematic diagram of the positional relationship of the first connection part relative to the second connection part according to an embodiment of the present invention.

In some embodiments of the present invention, FIG. 2 shows a schematic diagram of the positional relationship of the first connection part relative to the second connection part according to an embodiment of the present invention. As shown in FIG. 2, the movement variable includes the positional relationship of the first connection part relative to the second connection part; the positional relationship includes the vertical relationship of the first connection part relative to the second connection part, or the horizontal relationship of the first connection part relative to the second connection part, or the vertical relationship and the horizontal relationship of the first connection part relative to the second connection part; that is, the height and the damping force can be adjusted not only according to the vertical relationship of the first connection part relative to the second connection part, the height and the damping force can be adjusted but also according to the horizontal relationship of the first connection part relative to the second connection part, and the height and the damping force can also be adjusted according to both the vertical relationship and the horizontal relationship of the first connection part relative to the second connection part.

The positional relationship of the first connection part relative to the second connection part is a target value for adjustment, and the positional relationship is provided by the total working stroke of the pneumatic valve. Preferably, the positional relationship of the first connection part relative to the second connection part corresponds to the total working stroke of the pneumatic valve in accordance with a preset ratio. For example, the ratio of the positional relationship of the first connection part relative to the second connection part to the total working stroke of the pneumatic valve is 1:1, 1:2 or 1:3, etc. The ratio of the positional relationship of the first connection part relative to the second connection part to the total working stroke of the pneumatic valve will not be limited by the present embodiment. The total working stroke includes a total working stroke balance position S00 and at least three displacement threshold ranges, wherein a second displacement threshold range (S21, S22) contains a first displacement threshold range (S11, S12), and a third displacement threshold range (S31, S32) contains the second displacement threshold range (S21, S22). For example, the first displacement threshold range includes (−5 mm, +5 mm), the second displacement threshold range includes (−20 mm, +20 mm), and the third displacement threshold range includes (−25 mm, +25 mm). In practical applications, different displacement threshold ranges may be set according to actual needs. The displacement threshold ranges will not be further limited by the present embodiment.

The adjustment of the height and the damping force according to the positional relationship mainly includes the following modes, A first mode, the positional relationship of the first connection part relative to the second connection part is within the first displacement threshold range (S11, S12), the pneumatic valve neither controls the air spring to inflate or deflate nor carries out the gas driving on the damping force adjustment device to control the adjustable damper to output a corresponding damping force, and the damping force of the adjustable damper is a preset basic damping force; in this mode, it may be driving on a flat road without adjusting the height and the damping force, so that the damping force of the adjustable damper is a preset basic damping force, generally a smaller damping force, for example, the preset basic damping force includes 50 Newton (N), and the height of the air spring is a preset height.

A second mode, the positional relationship of the first connection part relative to the second connection part is between the first displacement threshold range (S11, S12) and the second displacement threshold range (S21, S22), and the pneumatic valve controls the air spring to inflate or deflate, but does not carry out the gas driving on the damping force adjustment device to control the adjustable damper to output a corresponding damping force, and the damping force of the adjustable damper is a preset damping force.

Specifically, in a process of the positional relationship of the first connection part relative to the second connection part changing from an upper limit S12 of the first displacement threshold range to an upper limit S22 of the second displacement threshold range, the pneumatic valve controls the air spring to deflate with a preset first gas flow, and the height of the air spring is decreased in a small amplitude because the first gas flow is relatively low, and meanwhile the damping force of the adjustable damper is a preset basic damping force. In addition, in a process of the positional relationship of the first connection part relative to the second connection part changing from a lower limit S11 of the first displacement threshold range to a lower limit S21 of the second displacement threshold range, the pneumatic valve controls the air spring to inflate with a preset first gas flow, and the height of the air spring is increased in a small amplitude because the first gas flow is relatively low, and meanwhile the damping force of the adjustable damper is the preset basic damping force, so that the positional relationship of the first connection part relative to the second connection part remains within the first displacement threshold range, so as to improve the comfort level.

A third mode, the positional relationship of the first connection part relative to the second connection part is between the second displacement threshold range (S21, S22) and the third displacement threshold range (S31, S32), and the pneumatic valve controls the air spring to inflate or deflate, and meanwhile carries out the gas driving on the damping force adjustment device to control the adjustable damper to output a first damping force, and the first damping force changes with the change of displacement. For example, the first damping force is from 50N to 1500N, and the first damping force increases or decreases with the change of the displacement.

Specifically, in a process of the positional relationship of the first connection part relative to the second connection part moving changing from an upper limit S22 of the second displacement threshold range to an upper limit S32 of the third displacement threshold range, the pneumatic valve controls the air spring to deflate with a preset second gas flow, the height of the air spring being decreased, and meanwhile carries out the gas driving on the damping force adjustment device to control the first damping force output the adjustable damper to gradually increase with the change of the displacement. In a process of a reverse movement, that is, in a process of the positional relationship of the first connection part relative to the second connection part moving changing from the upper limit S32 of the third displacement threshold range to the upper limit S22 of the second displacement threshold range, the pneumatic valve controls the air spring to deflate with a preset second gas flow, the height of the air spring being decreased, and meanwhile carries out the gas driving on the damping force adjustment device to control the first damping force output the adjustable damper to gradually decrease with the change of the displacement. In addition, in a process of the positional relationship of the first connection part relative to the second connection part changing from a lower limit S21 of the second displacement threshold range to a lower limit S31 of the third displacement threshold range, the pneumatic valve controls the air spring to inflate with the preset second gas flow, the height of the air spring being increased, and meanwhile carries out the gas driving on the damping force adjustment device to control the first damping force output the adjustable damper to gradually increase with the change of the displacement. In a process of a reverse movement, that is, in a process of the positional relationship of the first connection part relative to the second connection part changing from the lower limit S31 of the third displacement threshold range to the lower limit S21 of the second displacement threshold range, the pneumatic valve controls the air spring to inflate with the preset second gas flow, the height of the air spring being increased, and meanwhile carries out the gas driving on the damping force adjustment device to control the first damping force output the adjustable damper to gradually decrease with the change of the displacement. Wherein the second gas flow is greater than the first gas flow. In this mode, it may be driving on a rough road, and the air spring and the adjustable damper may be adjusted synchronously according to the road condition, so as to reduce vibration amplitude, to reduce discomfort caused by the rough road, so as to achieve the best comfort.

A fourth mode, the positional relationship of the first connection part relative to the second connection part exceeds the third displacement threshold range, the pneumatic valve controls the air spring to inflate or deflate, and meanwhile carries out the gas driving on the damping force adjustment device to control the adjustable damper to output a second damping force. For example, the second damping force includes 3000N, wherein the second damping force is a damping force corresponding to the terminal impact protection coefficient, and the first damping force is between the preset basic damping force and the second damping force.

Specifically, in a process of the positional relationship of the first connection part relative to the second connection part exceeding an upper limit of the third displacement threshold range, for example, the positional relationship of the first connection part relative to the second connection part being within the displacement threshold range from +25 mm to +∞ (positive infinity), the pneumatic valve controls the air spring to deflate with a preset third gas flow, the height of the air spring being decreased, and meanwhile carries out the gas driving on the damping force adjustment device to control the second damping force output by the adjustable damper. In addition, in a process of the positional relationship of the first connection part relative to the second connection part exceeding a lower limit of the third displacement threshold range, for example, the positional relationship of the first connection part relative to the second connection part being within the displacement threshold range from −∞ (negative infinity) to −25 mm, the pneumatic valve controls the air spring to inflate with the preset third gas flow, the height of the air spring being increased, and meanwhile carries out the gas driving on the damping force adjustment device to control the second damping force output by the adjustable damper. In this case, it may be driving on a violently bumpy road, and the air spring and the adjustable damper may be adjusted synchronously according to the road condition, so as to avoid rigid contact between the first connection part and the second connection part, so as to achieve the best comfort.

In some embodiments of the present invention, after the adjustable damper outputs the second damping force, the damping force adjustment device controls its own air pressure to reduce within a preset time, so that the second damping force output by the adjustable damper is not changed within the preset time to realize time delay adjustment of the damping force of the adjustable damper. In this case, a buffer period can be built in the process of transition from a violently bumpy road to a flat road, so as to reduce discomfort caused by immediate change from high damping force to low damping force, so as to further improve comfort.

In some embodiments of the present invention, the movement variable further comprises velocity and acceleration of the first connection part relative to the second connection part, wherein the velocity can be determined by at least two temporally consecutive positions of the first connection part relative to the second connection part, and the acceleration can be determined by at least two temporally consecutive velocities of the first connection part relative to the second connection part.

Further, when the positional relationship of the first connection part relative to the second connection part is within the second displacement threshold range (for example, the second displacement threshold range is from −20 mm to 20 mm) and the acceleration of the first connection part relative to the second connection part is greater than an acceleration threshold (for example, the acceleration threshold is 6 m/s$^2$), the adjustable damper is controlled to output a third damping force, the third damping force decreasing with the increase of the acceleration, or the third damping force increases with the decrease of the acceleration. For example, when driving on a road like a washboard, the positional relationship between the first connection part relative to the second connection part changes little, but the acceleration of the first connection part relative to the second connection part is relatively large. In this case, the adjustable damper is controlled to output a smaller third damping force to reduce the discomfort caused by road excitation, so as to obtain better comfort. It should be noted that the third damping force is smaller than the preset basic damping force 50N, for example, the third damping force is from 10N to 45N.

In some embodiments of the present invention, the method shown in FIG. 1 further includes: controlling the working stroke of the pneumatic valve to be shortened, lengthened or remain unchanged through a height adjustment device, so as to control the air spring to inflate, deflate or neither inflate nor deflate, to realize shift and memory adjustment of the positional relationship of the first connection part relative to the second connection part. For example, the height adjustment device may include the following three types. The first type of height adjustment device includes an adjustment handle and a lasso. The adjustment handle is connected to the pneumatic valve through the lasso. Specifically, the adjustment handle changes the working stroke of the pneumatic valve by controlling the length of the lasso, so as to control the air spring to inflate or deflate, and realize the shift adjustment of the height of the air spring, so as to realize the shift adjustment of the positional relationship between the first connection part relative to the second connection part; meanwhile, the length of the lasso is fixed by the adjustment handle, so that the working stroke of the pneumatic valve remains unchanged, so that the air spring is neither inflated nor deflated, so as to realize memory adjustment of the height of the air spring, so as to realize the memory adjustment of the positional relationship between the first connection part relative to the second connection part; in addition, once the length of the lasso is fixed, as mentioned above, suspension adjustment can be realized at a specific position through the pneumatic valve, which improves the comfort. The second type of height adjustment device includes a motor driving device. The motor driving device is connected to the pneumatic valve through the lasso. Specifically, the motor driving device changes the working stroke of the pneumatic valve by controlling the length of the lasso, so as to control the air spring to inflate or deflate, and realize the shift adjustment of the height of the air spring, so as to realize the shift adjustment of the positional relationship between the first connection part relative to the second connection part; meanwhile, the length of the lasso is fixed by the motor driving device, and the working stroke of the pneumatic valve remains unchanged, so that the air spring is neither inflated nor deflated, so as to realize memory adjustment of the height of the air spring, and realize the memory adjustment of the positional relationship between the first connection part relative to the second connection part; in addition, once the length of the lasso is fixed, as mentioned above, suspension adjustment can be realized at a specific position through the pneumatic valve, which improves the comfort. The third type of height adjustment device includes a motor driving device. The motor driving device is connected to the pneumatic valve directly. The working stroke of the pneumatic valve is changed directly or fixed at a specific position through the motor driving device, so as to control the air spring to inflate, deflate or neither inflate nor deflate, so that the height of the air spring is increased, decreased or fixed at a specific position, so as to realize the shift adjustment or the memory adjustment of the height of the air spring, thereby realizing the shift adjustment or the memory adjustment of the positional relationship between the first connection part relative to the second connection part; in addition, suspension adjustment is realized at a specific position through the pneumatic valve, which improves the comfort. For example, when the length of the lasso becomes longer, the working stroke of the pneumatic valve becomes shorter, and the air spring is controlled to inflate; when the length of the lasso becomes shorter, the working stroke of the pneumatic valve becomes longer, and the air spring is controlled to deflate. The length of the lasso and the working stroke of the pneumatic valve will not be further limited by the present embodiment. The users can adjust the positional relationship of the first connection part relative to the second connection part according to actual needs through the height adjustment device, so as to meet the needs of different users.

Further, balance position between the first connection part and the second connection part changes with the change of the positional relationship of the first connection part relative to the second connection part, and the pneumatic valve is configured to enable the first connection part or the second connection part to suspend at the balance position of the first connection part relative to the second connection part. Specifically, in a process of the height adjustment device adjusting the positional relationship between the first connection part relative to the second connection part to a specific position through the pneumatic valve, the working stroke of the pneumatic valve is shortened or extended, and meanwhile the pneumatic valve is constantly returned, so that the balance position of the pneumatic valve does not change relative to itself, but the balance position of the pneumatic valve constantly changes relative to the first connection part or the second connection part, so that the balance position of the first connection part relative to the second connection part constantly changes, and the balance position of the pneumatic valve is adapted to the balance position of the first connection part relative to the second connection part. For example, when the suspension system is a seat suspension system and the first connection part includes the upper frame of the seat, the second connection part includes the lower frame of the seat. If Xiaoming sits on the seat and adjusts the height of the seat to 100 mm, under the action of the pneumatic valve, the range of the suspension position of the seat at this time is from −10 mm to +10 mm; and if Xiaohong sits on the seat and adjusts the height of the seat to 80 mm, under the action of the pneumatic valve, the range of the suspension position of the seat at this time is still from −10 mm to +10 mm. As can be seen that the balance position of the first connection part relative to the second connection part changes with the change of the positional relationship of the first connection part relative to the second connection part, and the pneumatic valve enables the first connection part or the second connection part to realize suspending at the balance position of the first connection part relative to the second connection part.

It should be noted that when the corresponding ratio between the positional relationship between the first connection part and the second connection part to the working stroke of the pneumatic valve is 1:1, the balance position of the pneumatic valve is the balance position of the first connection part relative to the second connection part.

Figure 3:
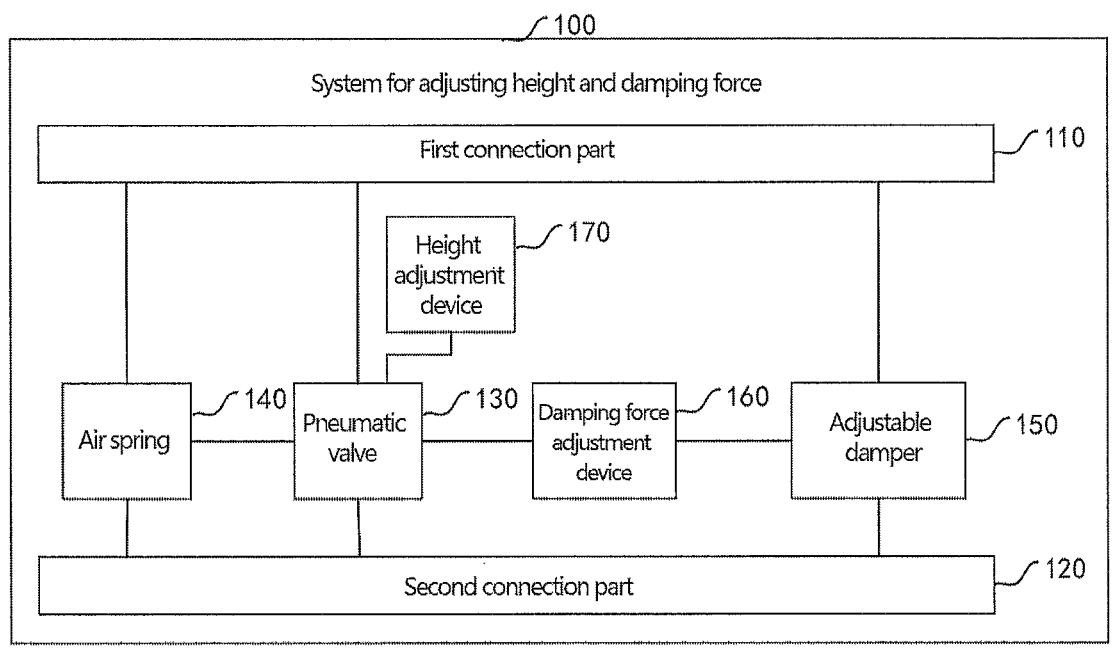
FIG. 3 shows a schematic functional structural diagram of a system for adjusting height and damping force according to an embodiment of the present invention.

In some embodiments of the present invention, FIG. 3 shows a schematic functional structural diagram of a system for adjusting height and damping force according to an embodiment of the present invention. As shown in FIG. 3, the system 100 for adjusting height and damping force includes a first connection part 110, a second connection part 120, at least one pneumatic valve 130, an air spring 140, an adjustable damper 150 and a damping force adjustment device 160 used for adjusting the damping force of the adjustable damper 150; the pneumatic valve 130, the air spring 140, the adjustable damper 150 and the damping force adjustment device 160 are arranged between a first connection part 110 and a second connection part 120; the positions of the pneumatic valve 130, the air spring 140, the adjustable damper 150 and the damping force adjustment device 160 fit with each other; and the pneumatic valve 130 is connected to the damping force adjustment device 160 and the air spring 140, respectively. Specifically, a first gas output of the pneumatic valve 130 is connected to a gas input of the damping force adjustment device, and the second gas output of the pneumatic valve 130 is connected to a connection port of the air spring 140.

Wherein the pneumatic valve 130 is of a linear structure, the pneumatic valve 130 includes a driving rod and a valve body, the driving rod performs reciprocating linear motion inside the valve body, the driving rod is connected to the first connection part 110, and the valve body is connected to the second connection part 120. It should be noted that the present embodiment does not further limit the positions of the pneumatic valve 130, the air spring 140 and the adjustable damper 150, as long as the pneumatic valve 130 can collect the movement variable between the first connection part 110 and the second connection part 120, the air spring 140 can provide support between the first connection part 110 and the second connection part 120 and change the positional relationship between the first connection part 110 and the second connection part 120, and the adjustable damper 150 can provide shock absorption effect for the first connection part 110 or the second connection part 120. The damping force adjustment device 160 includes a device for controlling swinging direction and the size of swinging amplitude of the adjustment pin of the adjustable damper 150. The first gas output of the pneumatic valve 130 is connected to the gas input of the damping force adjustment device 160 for adjusting the damping force of the adjustable damper 150, so that a gas flow connection can be generated between the pneumatic valve 130 and the damping force adjustment device 160, wherein in the process of communication of the damping force adjustment device 160 with the pneumatic valve 130, the damping force adjustment device 160 is also communicated with the atmosphere, so as to realize gas driving by the pneumatic valve 130 on the damping force adjustment device 160 to perform corresponding operations, that is, the pneumatic valve 130 carries out the gas driving on the damping force adjustment device 160 to connect with the air source and the atmosphere and controls the adjustable damper 150 to output a corresponding damping force; the second gas output of the pneumatic valve 130 is connected to the connection port of the air spring 140, so that a gas flow connection can be generated between the pneumatic valve 130 and the air spring 140, so that the air spring 140 is enabled to be connected to the air source or the atmospheric, thereby realizing inflation or deflation of the air spring 140.

In addition, when the first connection part 110 includes a driver's compartment, the second connection part 120 includes a chassis frame, that is, the pneumatic valve 130, the air spring 140, the adjustable damper 150 and the damping force adjustment device 160 used for adjusting the damping force of the adjustable damper 150 are arranged between the driver's compartment and the chassis frame. When the first connection part 110 includes a vehicle chassis, the second connection part 120 includes a wheel, that is, the pneumatic valve 130, the air spring 140, the adjustable damper 150 and the damping force adjustment device 160 used for adjusting the damping force of the adjustable damper 150 are arranged between the vehicle chassis and the wheel. When the first connection part 110 includes the upper frame of the seat, the second connection part 120 includes the lower frame of the seat, that is, the pneumatic valve 130, the air spring 140, the adjustable damper 150 and the damping force adjustment device 160 used for adjusting the damping force of the adjustable damper 150 are arranged between the upper frame of the seat and the lower frame of the seat. When the first connection part 110 includes the sliding horizontal axis of the seat scissor frame, the second connection part 120 includes the rotating pin shaft of the seat scissor frame, that is, the pneumatic valve 130 and the adjustable damper 150 are arranged between the sliding horizontal axis of the seat scissor frame and the rotating pin shaft of the seat scissor frame, and the air spring 140 and the damping force adjustment device 160 used for adjusting the damping force of the adjustable damper 150 are arranged at a corresponding position.

The pneumatic valve 130 is configured to collect at least one movement variable of the first connection part 110 relative to the second connection part 120; the movement variable includes the positional relationship of the first connection part 110 relative to the second connection part 120, the velocity of the first connection part 110 relative to the second connection part 120, and the acceleration of the first connection part 110 relative to the second connection part 120. The present embodiment does not further limit the movement variable, and meanwhile, according to the collected movement variable and/or the change in the movement variable, controls the air spring 140 to inflate or deflate so as to realize height adjustment; and/or carries out gas driving on the damping force adjustment device 160 to control the adjustable damper 150 to output corresponding damping force, so as to realize adjustment of the size of the damping force of the adjustable damper 150. Wherein the change of the movement variable is determined through at least two temporally consecutive movement variables of the first connection part 110 relative to the second connection part 120. After the pneumatic valve 130 collects the movement variable between the first connection part 110 and the second connection part 120, or after the pneumatic valve 130 collects the change of the movement variable between the first connection part 110 and the second connection part 120, or after the pneumatic valve 130 collects the movement variable and the change of the movement variable between the first connection part 110 and the second connection part 120, the gas flow inside the pneumatic valve 130 changes. Because the first gas output of the pneumatic valve 130 is connected to the gas input of the damping force adjustment device used for adjusting the damping force of the adjustable damper 150, the change of the gas flow inside the pneumatic valve 130 drives the change of the gas flow inside the damping force adjustment device, so that the damping force adjustment device is triggered to control the swinging direction and the size of the swinging amplitude of the adjustment pin of the adjustable damper 150, so that the adjustable damper 150 outputs the damping force corresponding to the swinging direction and the swinging amplitude, so as to realize the adjustable size of the damping force of the adjustable damper 150; in addition, while the gas flow inside the pneumatic valve 130 changes, the working stroke of the pneumatic valve 130 changes. Because the second gas output of the pneumatic valve 130 is connected to the connection port of the air spring 140, when the working stroke of the pneumatic valve 130 changes, the pneumatic valve 130 and the air spring 140 can generate a gas flow connection, so that the air spring 140 is enabled to be connected to the air source or the atmosphere, so as to realize inflation or deflation of the air spring 140, to realize height adjustment.

As can be known from the above, in the technical solution of the present embodiment, by collecting at least one movement variable of the first connection part 110 relative to the second connection part 120 by the pneumatic valve 130, and directly carrying out gas driving on the damping force adjustment device by the pneumatic valve 130 to adjust the size of the damping force of the adjustable damper 150, and meanwhile directly controlling the air spring 140 to inflate or deflate by the pneumatic valve 130 to adjust the height, synchronous adjustment of height and damping force is realized through coordinative cooperation of the mechanical mechanisms, which, compared with realization of synchronous adjustment of height and damping force in a manner of electric control in the prior art, improves sensitivity of height adjustment and shock absorption adjustment, and further improves comfort level. In addition, the technical solution of the present embodiment makes it unnecessary for the driver to manually adjust the damping force and the height in the process of driving, so that the driver's attention is more concentrated and occurrence of traffic accidents can be reduced to a certain extent.

In some embodiments of the present invention, as shown in combination with FIG. 2 and FIG. 3, the pneumatic valve 130 is configured to collect the positional relationship of the first connection part 110 relative to the second connection part 120; the positional relationship includes a vertical relationship and/or a horizontal relationship; that is, the positional relationship includes the vertical relationship of the first connection part 110 relative to the second connection part 120, or the horizontal relationship of the first connection part 110 relative to the second connection part 120, or the vertical relationship and the horizontal relationship of the first connection part 110 relative to the second connection part 120; that is, the height and the damping force can be adjusted not only according to the vertical relationship of the first connection part 110 relative to the second connection part 120, the height and the damping force can be adjusted but also according to the horizontal relationship of the first connection part 110 relative to the second connection part 120, and the height and the damping force can also be adjusted according to both the vertical relationship and the horizontal relationship of the first connection part 110 relative to the second connection part 120.

The positional relationship of the first connection part 110 relative to the second connection part 120 is a target value for adjustment, and the positional relationship is provided by the total working stroke of the pneumatic valve 130. Preferably, the positional relationship of the first connection part 110 relative to the second connection part 120 corresponds to the total working stroke of the pneumatic valve 130 in accordance with a preset ratio. For example, the ratio of the positional relationship of the first connection part 110 relative to the second connection part 120 to the total working stroke of the pneumatic valve 130 is 1:1, 1:2 or 1:3, etc. The ratio of the positional relationship of the first connection part 110 relative to the second connection part 120 to the total working stroke of the pneumatic valve 130 will not be limited by the present embodiment. The total working stroke includes a total working stroke balance position S00 and at least three displacement threshold ranges, wherein a second displacement threshold range (S21, S22) contains a first displacement threshold range (S11, S12), and a third displacement threshold range (S31, S32) contains the second displacement threshold range (S21, S22). For example, the first displacement threshold range includes (−5 mm, +5 mm), the second displacement threshold range includes (−20 mm, +20 mm), and the third displacement threshold range includes (−25 mm, +25 mm). In practical applications, different displacement threshold ranges may be set according to actual needs. The displacement threshold ranges will not be further limited by the present embodiment.

The adjustment of the height and the damping force according to the positional relationship mainly includes the following modes:

A first mode, the positional relationship of the first connection part 110 relative to the second connection part 120 is within the first displacement threshold range (S11, S12), the pneumatic valve 130 is specifically configured to neither control the air spring 140 to inflate or deflate nor carry out the gas driving on the damping force adjustment device 160 to control the adjustable damper 150 to output a corresponding damping force, and the damping force of the adjustable damper 150 is a preset basic damping force; in this mode, it may be driving on a flat road without adjusting the height and the damping force, so that the damping force of the adjustable damper 150 is a preset basic damping force, generally a smaller damping force, for example, the preset basic damping force includes 50 Newton (N), and the height of the air spring 140 is a preset height.

A second mode, the positional relationship of the first connection part 110 relative to the second connection part 120 is between the first displacement threshold range (S11, S12) and the second displacement threshold range (S21, S22), and the pneumatic valve 130 is specifically configured to control the air spring 140 to inflate or deflate, but not carry out the gas driving on the damping force adjustment device 160 to control the adjustable damper 150 to output a corresponding damping force, and the damping force of the adjustable damper 150 is a preset damping force.

Specifically, in a process of the positional relationship of the first connection part 110 relative to the second connection part 120 changing from an upper limit S12 of the first displacement threshold range to an upper limit S22 of the second displacement threshold range, the pneumatic valve 130 is specifically configured to control the air spring 140 to deflate with a preset first gas flow, and the height of the air spring 140 is decreased in a small amplitude because the first gas flow is relatively low, and meanwhile the damping force of the adjustable damper 150 is a preset basic damping force. In addition, in a process of the positional relationship of the first connection part 110 relative to the second connection part 120 changing from a lower limit S11 of the first displacement threshold range to a lower limit S21 of the second displacement threshold range, the pneumatic valve 130 is specifically configured to control the air spring 140 to inflate with a preset first gas flow, and the height of the air spring 140 is increased in a small amplitude because the first gas flow is relatively low, and meanwhile the damping force of the adjustable damper 150 is the preset basic damping force, so that the positional relationship of the first connection part 110 relative to the second connection part 120 remains within the first displacement threshold range, so as to improve the comfort level.

A third mode, the positional relationship of the first connection part 110 relative to the second connection part 120 is between the second displacement threshold range (S21, S22) and the third displacement threshold range (S31, S32), and the pneumatic valve 130 is specifically configured to control the air spring 140 to inflate or deflate, and meanwhile carry out the gas driving on the damping force adjustment device 160 to control the adjustable damper 150 to output a first damping force, and the first damping force changes with the change of displacement. For example, the first damping force is from 50N to 1500N, and the first damping force increases or decreases with the change of the displacement.

Specifically, in a process of the positional relationship of the first connection part 110 relative to the second connection part 120 changing from an upper limit S22 of the second displacement threshold range to an upper limit S32 of the third displacement threshold range, the pneumatic valve 130 is specifically configured to control the air spring 140 to deflate with a preset second gas flow, the height of the air spring 140 being decreased, and meanwhile carry out the gas driving on the damping force adjustment device 160 to control the first damping force output the adjustable damper 150 to gradually increase with the change of the displacement. In a process of a reverse movement, that is, in a process of the positional relationship of the first connection part 110 relative to the second connection part 120 moving from the upper limit S32 of the third displacement threshold range to the upper limit S22 of the second displacement threshold range, the pneumatic valve 130 is specifically configured to control the air spring 140 to deflate with a preset second gas flow, the height of the air spring 140 being decreased, and meanwhile carry out the gas driving on the damping force adjustment device 160 to control the first damping force output the adjustable damper 150 to gradually decrease with the change of the displacement. In addition, in a process of the positional relationship of the first connection part 110 relative to the second connection part 120 changing from a lower limit S21 of the second displacement threshold range to a lower limit S31 of the third displacement threshold range, the pneumatic valve 130 is specifically configured to control the air spring 140 to inflate with the preset second gas flow, the height of the air spring 140 being increased, and meanwhile carry out the gas driving on the damping force adjustment device 160 to control the first damping force output the adjustable damper 150 to gradually increase with the change of the displacement. In a process of a reverse movement, that is, in a process of the positional relationship of the first connection part 110 relative to the second connection part 120 changing from the lower limit S31 of the third displacement threshold range to the lower limit S21 of the second displacement threshold range, the pneumatic valve 130 is specifically configured to control the air spring 140 to inflate with the preset second gas flow, the height of the air spring 140 being increased, and meanwhile carry out the gas driving on the damping force adjustment device 160 to control the first damping force output the adjustable damper 150 to gradually decrease with the change of the displacement. Wherein the second gas flow is greater than the first gas flow. In this mode, it may be driving on a rough road, and the air spring 140 and the adjustable damper 150 may be adjusted synchronously according to the road condition, so as to reduce vibration amplitude, to reduce discomfort caused by the rough road, so as to achieve the best comfort.

A fourth mode, the positional relationship of the first connection part 110 relative to the second connection part 120 exceeds the third displacement threshold range, the pneumatic valve 130 is specifically configured to control the air spring 140 to inflate or deflate, and meanwhile carry out the gas driving on the damping force adjustment device 160 to control the adjustable damper 150 to output a second damping force. For example, the second damping force includes 3000 Newton (N), wherein the second damping force is a damping force corresponding to the terminal impact protection coefficient, and the first damping force is between the preset basic damping force and the second damping force. In this case, it may be driving on a violently bumpy road, and the air spring 140 and the adjustable damper 150 may be adjusted synchronously according to the road condition, so as to avoid rigid contact between the first connection part 110 and the second connection part 120, so as to achieve the best comfort.

Specifically, in a process of the positional relationship of the first connection part 110 relative to the second connection part 120 exceeding an upper limit of the third displacement threshold range, for example, the positional relationship of the first connection part 110 relative to the second connection part 120 being within the displacement threshold range from +25 mm to +∞, the pneumatic valve 130 is specifically configured to control the air spring 140 to deflate with a preset third gas flow, the height of the air spring 140 being decreased, and meanwhile carry out the gas driving on the damping force adjustment device 160 to control the second damping force output by the adjustable damper 150. In addition, in a process of the positional relationship of the first connection part 110 relative to the second connection part 120 exceeding a lower limit of the third displacement threshold range, for example, the positional relationship of the first connection part 110 relative to the second connection part 120 being within the displacement threshold range from −∞ to −25 mm, the pneumatic valve 130 is specifically configured to control the air spring 140 to inflate with the preset third gas flow, the height of the air spring 140 being increased, and meanwhile carry out the gas driving on the damping force adjustment device 160 to control the second damping force output by the adjustable damper 150. In this case, it may be driving on a violently bumpy road, and the air spring 140 and the adjustable damper 150 may be adjusted synchronously according to the road condition, so as to avoid rigid contact between the first connection part 110 and the second connection part 120, so as to achieve the best comfort.

In some embodiments of the present invention, the damping force adjustment device 160 is configured to, after the adjustable damper 150 outputs the second damping force, control its own air pressure to reduce within a preset time, so that the second damping force output by the adjustable damper 150 is not changed within the preset time to realize time delay adjustment of the damping force of the adjustable damper 150. In this case, a buffer period can be built in the process of transition from a violently bumpy road to a flat road, so as to reduce discomfort caused by immediate change from high damping force to low damping force, so as to further improve comfort.

In some embodiments of the present invention, the pneumatic valve 130 is configured to collect velocity and/or acceleration of the first connection part 110 relative to the second connection part 120, wherein the velocity can be determined by at least two temporally consecutive positions of the first connection part 110 relative to the second connection part 120, and the acceleration can be determined by at least two temporally consecutive velocities of the first connection part 110 relative to the second connection part 120.

Further, when the positional relationship of the first connection part 110 relative to the second connection part 120 is within the second displacement threshold range (for example, the second displacement threshold range is from −20 mm to 20 mm), and the acceleration of the first connection part 110 relative to the second connection part 120 is greater than an acceleration threshold (for example, the acceleration threshold is 6 m/s$^2$), the adjustable damper 150 is controlled to output a third damping force, the third damping force decreasing with the increase of the acceleration, or the third damping force increases with the decrease of the acceleration. For example, when driving on a road like a washboard, the positional relationship between the first connection part 110 relative to the second connection part 120 changes little, but the acceleration of the first connection part 110 relative to the second connection part 120 is relatively large. In this case, the adjustable damper 150 is controlled to output a smaller third damping force to reduce the discomfort caused by road excitation, so as to obtain better comfort. It should be noted that the third damping force is smaller than the preset basic damping force 50N, for example, the third damping force is from 10N to 45N.

In some embodiments of the present invention, the system shown in FIG. 3 further includes: controlling the working stroke of the pneumatic valve 130 to be shortened, lengthened or remain unchanged through a height adjustment device 170, so as to control the air spring 140 to inflate, deflate or neither inflate nor deflate, to realize shift and memory adjustment of the positional relationship of the first connection part 110 relative to the second connection part 120. For example, the height adjustment device 170 may include the following three types. The first type of height adjustment device 170 includes an adjustment handle and a lasso. The adjustment handle is connected to the pneumatic valve 130 through the lasso. Specifically, the adjustment handle changes the working stroke of the pneumatic valve 130 by controlling the length of the lasso, so as to control the air spring 140 to inflate or deflate, and realize the shift adjustment of the height of the air spring 140, so as to realize the shift adjustment of the positional relationship between the first connection part 110 relative to the second connection part 120; meanwhile, the length of the lasso is fixed by the adjustment handle, so that the working stroke of the pneumatic valve 130 remains unchanged, so that the air spring 140 is neither inflated nor deflated, so as to realize memory adjustment of the height of the air spring 140, so as to realize the memory adjustment of the positional relationship between the first connection part 110 relative to the second connection part 120; in addition, once the length of the lasso is fixed, as mentioned above, suspension adjustment can be realized at a specific position through the pneumatic valve 130, which improves the comfort. The second type of height adjustment device 170 includes a motor driving device. The motor driving device is connected to the pneumatic valve 130 through the lasso. Specifically, the motor driving device changes the working stroke of the pneumatic valve 130 by controlling the length of the lasso, so as to control the air spring 140 to inflate or deflate, and realize the shift adjustment of the height of the air spring 140, so as to realize the shift adjustment of the positional relationship between the first connection part 110 relative to the second connection part 120; meanwhile, the length of the lasso is fixed by the motor driving device, so that the working stroke of the pneumatic valve 130 remains unchanged, so that the air spring 140 is neither inflated nor deflated, so as to realize memory adjustment of the height of the air spring 140, so as to realize the memory adjustment of the positional relationship between the first connection part 110 relative to the second connection part 120; in addition, once the length of the lasso is fixed, as mentioned above, suspension adjustment can be realized at a specific position through the pneumatic valve 130, which improves the comfort. The third type of height adjustment device 170 includes a motor driving device. The motor driving device is connected to the pneumatic valve 130 directly. The working stroke of the pneumatic valve 130 is changed directly or fixed at a specific position through the motor driving device, so as to control the air spring 140 to inflate, deflate or neither inflate nor deflate, so that the height of the air spring 140 is increased, decreased or fixed at a specific position, so as to realize the shift adjustment or the memory adjustment of the height of the air spring 140, thereby realizing the shift adjustment or the memory adjustment of the positional relationship between the first connection part 110 relative to the second connection part 120; in addition, suspension adjustment is realized at a specific position through the pneumatic valve 130, which improves the comfort. For example, when the length of the lasso becomes longer, the working stroke of the pneumatic valve 130 becomes shorter, and the air spring 140 is controlled to inflate; when the length of the lasso becomes shorter, the working stroke of the pneumatic valve 130 becomes longer, and the air spring 140 is controlled to deflate. The length of the lasso and the working stroke of the pneumatic valve 130 will not be further limited by the present embodiment. The user can adjust the positional relationship of the first connection part 110 relative to the second connection part 120 according to actual needs through the height adjustment device 170, so as to meet the needs of different users.

Further, balance position between the first connection part 110 and the second connection part 120 changes with the change of the positional relationship of the first connection part 110 relative to the second connection part 120, and the pneumatic valve 130 is configured to enable the first connection part 110 or the second connection part 120 to realize suspending at the balance position of the first connection part 110 relative to the second connection part 120. Specifically, in a process of the height adjustment device 170 adjusting the positional relationship between the first connection part 110 relative to the second connection part 120 to a specific position through the pneumatic valve 130, the working stroke of the pneumatic valve 130 is shortened or extended, and meanwhile the pneumatic valve 130 is constantly returned, so that the balance position of the pneumatic valve 130 does not change relative to itself, but the balance position of the pneumatic valve 130 constantly changes relative to the first connection part 110 or the second connection part 120, so that the balance position of the first connection part 110 relative to the second connection part 120 constantly changes, and the balance position of the pneumatic valve 130 is adapted to the balance position of the first connection part 110 relative to the second connection part 120. For example, when the suspension system is a seat suspension system, and the first connection part 110 includes the upper frame of the seat, the second connection part 120 includes the lower frame of the seat. If Xiaoming sits on the seat and adjusts the height of the seat to 100 mm, under the action of the pneumatic valve 130, the range of the suspension position of the seat at this time is from −10 mm to +10 mm; and if Xiaohong sits on the seat and adjusts the height of the seat to 80 mm, under the action of the pneumatic valve 130, the range of the suspension position of the seat at this time is still from −10 mm to +10 mm. As can be seen that the balance position of the first connection part 110 relative to the second connection part 120 changes with the change of the positional relationship of the first connection part 110 relative to the second connection part 120, and the pneumatic valve 130 enables the first connection part 110 or the second connection part 120 to realize suspending at the balance position of the first connection part 110 relative to the second connection part 120.

It should be noted that when the corresponding ratio between the positional relationship between the first connection part 110 and the second connection part 120 to the working stroke of the pneumatic valve 130 is 1:1, the balance position of the pneumatic valve 130 is the balance position of the first connection part 110 relative to the second connection part 120.

Figure 4:
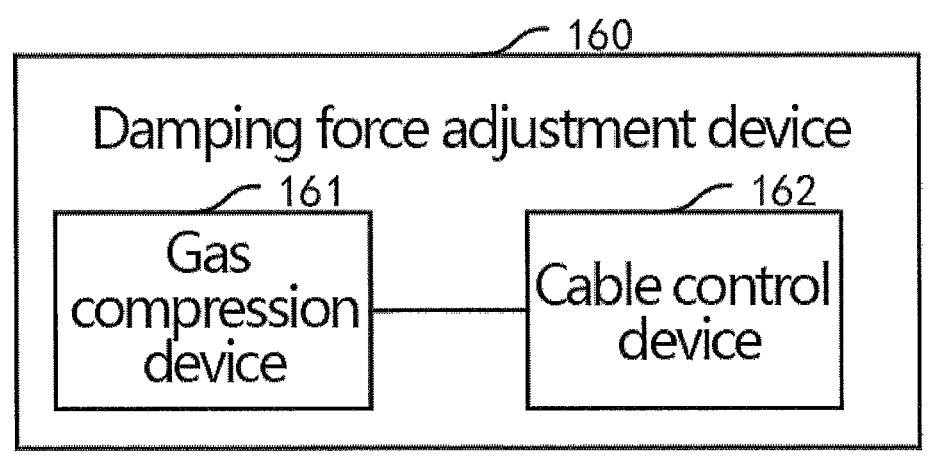
FIG. 4 shows a schematic functional structure diagram of an adjustment device according to an embodiment of the present invention.

In some embodiments of the present invention, FIG. 4 shows a schematic functional structure diagram of a damping force adjustment device according to an embodiment of the present invention. As shown in FIG. 4, the damping force adjustment device 140 includes a gas compression device 161 and a cable control device 162 driven by the gas compression device 161, wherein the cable control device 162 can be connected to the adjustable damper 150. Specifically, the cable control device 162 is connected to the adjustment pin of the adjustable damper 150, and the cable control device 162 has a returning spring that drives the adjustment pin of the adjustable damper 150 to reciprocate.

The pneumatic valve 130 changes its internal gas flow according to the collected movement variable and/or the change of the movement variable, to carry out the gas driving on a state quantity of the gas inside the gas compression device 161 and the frequency of the change of the state quantity, for example, gas pressure and the frequency of the change of the gas pressure, so as to change the size of the stroke of the gas compression device 161. When the stroke of the gas compression device 161 becomes larger, the driving force of the cable control device 162 becomes larger; when the stroke of the gas compression device 161 becomes smaller, the driving force of the cable control device 162 becomes smaller. Because the returning force of the cable control device 162 is provided by a returning spring, under the premise of not changing the returning spring, the returning force of the cable control device 162 has a linear relationship with the driving force of the cable control device 162. Therefore, by changing the size of the stroke of the gas compression device 161, matching relationship between the driving force and the returning force of the cable control device 162 can be adjusted, so as to drive an adjustment pin of the adjustable damper 150 to swing back and forth, that is, to drive the swinging direction and the size of the swinging amplitude of the adjustment pin of the adjustable damper, and so as to control the adjustable damper to output the corresponding damping force, and realize adaptive adjustment of the damping force of the adjustable damper.

Figure 5:
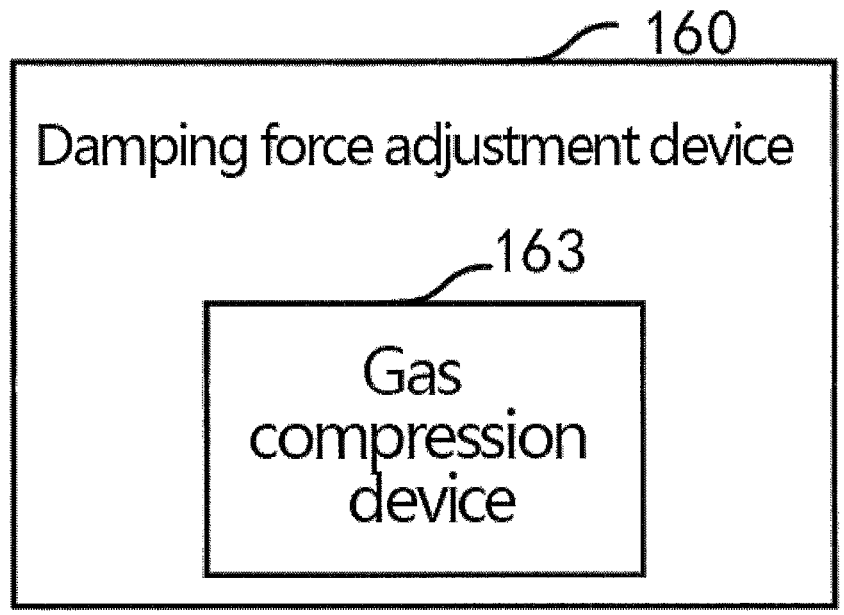
FIG. 5 shows a schematic functional structure diagram of another adjustment device according to an embodiment of the present invention.

In some embodiments of the present invention, FIG. 5 shows a schematic functional structure diagram of another damping force adjustment device according to an embodiment of the present invention. As shown in FIG. 5, the damping force adjustment device 140 comprises a gas compression device 163 driven by the pneumatic valve 130, the gas compression device 163 being connected to the adjustable damper 150; specifically, the driving rod of the gas compression device 163 is connected to the adjustment pin of the adjustable damper 150;

The pneumatic valve 130 changes its internal gas flow according to the collected movement variable and/or the change of the movement variable. Since the pneumatic valve 130 is connected to the gas compression device 163, the gas flow inside the gas compression device 163 changes with the internal gas flow inside the pneumatic valve 130, so that the stroke of the gas compression device 163 changes, that is, the relative displacement between the driving rod and the cylinder of the gas compression device 163 changes, so as to achieve the purpose of adjusting the size of the stroke of the gas compression device 163. Since the driving rod of the gas compression device 163 is connected to the adjustment pin of the adjustable damper 150, when the pneumatic valve 130 carries out the gas driving on the driving rod of the gas compression device 163 to reciprocate in the cylinder, the driving rod of the gas compression device 163 drives the adjustment pin of the adjustable damper 150 to swing in a reciprocating way by a corresponding amplitude, and the adjustable damper is controlled to output a corresponding damping force, so as to realize the adaptive adjustment of the damping force of the adjustable damper 150.

It should be noted that the gas compression device 163 shown in FIG. 5 and the gas compression device 161 shown in FIG. 4 are the same in the functional structure and the working principle, and both are mainly composed of two parts of a driving rod and a cylinder. Of course, in other embodiments, the functional structures and the working principles of the gas compression device 163 and the gas compression device 161 may also be different.

Figure 6:
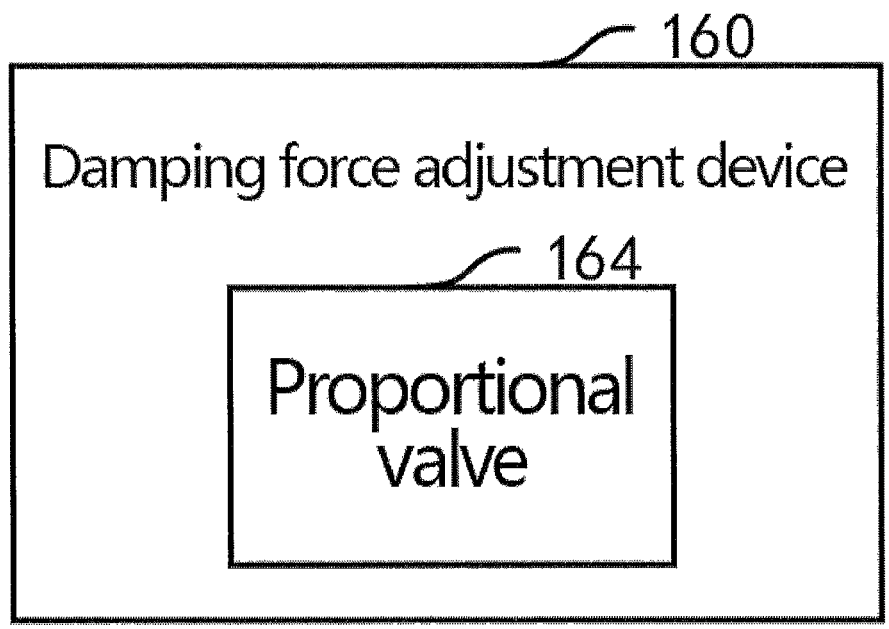
FIG. 6 shows a schematic functional structure diagram of still another adjustment device according to an embodiment of the present invention.

In some embodiments of the present invention, FIG. 6 shows a schematic functional structure diagram of still another damping force adjustment device according to an embodiment of the present invention. As shown in FIG. 6, the damping force adjustment device 140 includes a proportional valve 164, the proportional valve 164 being connected to a valve port of a damping fluid flow chamber of the adjustable damper 150. The pneumatic valve 130 changes its internal gas flow according to the collected movement variable and/or the changes of the movement variable to change the working stroke of the proportional valve 164 by the gas driving, thereby controlling the size of the flow path of the valve port of the damping fluid flow chamber of the adjustable damper 150. Because the sizes of the flow paths of the valve ports of the damping fluid flow chambers are different, the flows and/or flow rates of the damping fluid are different, so as to achieve the purpose of adjusting the damping fluid flow, the damping fluid flow rate or the damping fluid flow and flow rate of the adjustable damper 150, finally to control the adjustable damper to output the corresponding damping force, and to realize adaptive adjustment of the damping force of the adjustable damper 150.

It should be noted that the system for adjusting the height of the suspension system can be applied in the fields of seat suspension system, vehicle chassis suspension system, driver's compartment suspension system, etc. The fields for applying the system for adjusting the height of the suspension system will not be further limited by the present embodiment.

In summary, in the technical solution of the present embodiment, by collecting at least one movement variable of the first connection part relative to the second connection part by the pneumatic valve, and directly carrying out gas driving on the adjustment device by the pneumatic valve to adjust the size of the damping force of the damper, and meanwhile directly controlling the air spring to inflate or deflate by the pneumatic valve to adjust the height, synchronous adjustment of height and damping force is realized through coordinative cooperation of the mechanical mechanisms, which, compared with realization of synchronous adjustment of height and damping force in a manner of electric control in the prior art, improves sensitivity of height adjustment and damping force adjustment, and further improves comfort level. In addition, the technical solution of the present embodiment makes it unnecessary for the driver to manually adjust the damping force and the height in the process of driving, so that the driver's attention is more concentrated and occurrence of traffic accidents can be reduced to a certain extent.

Finally, it should be noted that the above are only preferred embodiments of the present invention, and are not intended to limit the protection scope of the present invention. Although the present invention has been described in detail with reference to the foregoing respective embodiments, for those skilled in the art, it is still possible to modify the technical solutions described in the foregoing respective embodiments, or perform equivalent replacements to some of the technical features therein. Any modification, equivalent replacement, improvement, etc. made within the spirit and principle of the present invention are contained within the protection scope of the present invention.

What is claimed is:

1. A method for adjusting height and damping force, comprising:

arranging a pneumatic valve, an air spring, an adjustable damper and a damping force adjustment device configured to adjust the damping force of the adjustable damper between a first connection part and a second connection part, wherein the positions of the pneumatic valve, the air spring, the adjustable damper and the damping force adjustment device fit with each other, and the pneumatic valve is connected to the damping force adjustment device and the air spring respectively;

collecting, by the pneumatic valve, at least one movement variable of the first connection part relative to the second connection part; and controlling, by the pneumatic valve, the air spring to inflate or deflate according to at least one of the collected movement variable and change in the movement variable, so as to realize height adjustment; and/or carrying out gas driving on the damping force adjustment device to control the adjustable damper to output corresponding damping force, so as to realize adjustment of size of the damping force of the adjustable damper;

wherein the movement variable comprises a positional relationship of the first connection part relative to the second connection part, and the positional relationship includes at least one of a vertical relationship and a horizontal relationship;

the positional relationship of the first connection part relative to the second connection part being a target value for adjustment, the positional relationship being provided by a total working stroke of the pneumatic valve, and the total working stroke including a total working stroke balance position and at least three displacement threshold ranges, wherein a second displacement threshold range contains a first displacement threshold range, and a third displacement threshold range contains the second displacement threshold range;

the positional relationship of the first connection part relative to the second connection part being within the first displacement threshold range, the pneumatic valve neither controlling the air spring to inflate or deflate nor carrying out the gas driving on the damping force adjustment device to control the adjustable damper to output a corresponding damping force, and the damping force of the adjustable damper being a preset basic damping force;

the positional relationship of the first connection part relative to the second connection part being between the first displacement threshold range and the second displacement threshold range, the pneumatic valve controlling the air spring to inflate or deflate, but not carrying out the gas driving on the damping force adjustment device to control the adjustable damper to output a corresponding damping force, and the damping force of the adjustable damper being a preset damping force;

the positional relationship of the first connection part relative to the second connection part being between the second displacement threshold range and the third displacement threshold range, the pneumatic valve controlling the air spring to inflate or deflate and meanwhile carrying out the gas driving on the damping force adjustment device to control the adjustable damper to output a first damping force, and the first damping force changing with the change of displacement;

the positional relationship of the first connection part relative to the second connection part exceeding the third displacement threshold range, and the pneumatic valve controlling the air spring to inflate or deflate and meanwhile carrying out the gas driving on the damping force adjustment device to control the adjustable damper to output a second damping force;

wherein the second damping force is a damping force corresponding to an terminal impact protection coefficient, and the first damping force is between the preset basic damping force and the second damping force.

2. The method for adjusting height and damping force according to claim 1, wherein the movement variable further comprises a velocity and an acceleration of the first connection part relative to the second connection part, wherein the velocity is determined by at least two temporally consecutive positions of the first connection part relative to the second connection part, and the acceleration is determined by at least two temporally consecutive velocities of the first connection part relative to the second connection part.

3. The method for adjusting height and damping force according to claim 2, wherein when the positional relationship of the first connection part relative to the second connection part is within the second displacement threshold range and the acceleration of the first connection part relative to the second connection part is greater than an acceleration threshold, the adjustable damper is controlled to output a third damping force, the third damping force decreasing with increase of the acceleration, or the third damping force increasing with decrease of the acceleration, wherein the third damping force is smaller than the preset basic damping force.

4. The method for adjusting height and damping force according to claim 1, wherein after the adjustable damper outputs the second damping force, the damping force adjustment device controls its own air pressure to reduce within a preset time, so that the second damping force output by the adjustable damper is not changed within the preset time to realize time delay adjustment of the damping force of the adjustable damper.

5. The method for adjusting height and damping force according to claim 1, wherein the positional relationship of the first connection part relative to the second connection part being between the first displacement threshold range and the second displacement threshold range, the pneumatic valve controlling the air spring to inflate or deflate, but not carrying out the gas driving on the damping force adjustment device to control the adjustable damper to output a corresponding damping force, and the damping force of the adjustable damper being a preset damping force, comprise:

in a process of the positional relationship of the first connection part relative to the second connection part changing from an upper limit of the first displacement threshold range to an upper limit of the second displacement threshold range, the pneumatic valve controls the air spring to deflate with a preset first gas flow, the height of the air spring being decreased, and meanwhile the damping force of the adjustable damper being a preset basic resistance;

or in a process of the positional relationship of the first connection part relative to the second connection part changing from a lower limit of the first displacement threshold range to a lower limit of the second displacement threshold range, the pneumatic valve controls the air spring to inflate with the preset first gas flow, the height of the air spring being increased, and meanwhile the damping force of the adjustable damper being the preset basic damping force.

6. The method for adjusting height and damping force according to claim 5, wherein the positional relationship of the first connection part relative to the second connection part being between the second displacement threshold range and the third displacement threshold range, the pneumatic valve controlling the air spring to inflate or deflate and meanwhile carrying out the gas driving on the damping force adjustment device to control the adjustable damper to output a first damping force, and the first damping force changing with the change of displacement, comprises:

in a process of the positional relationship of the first connection part relative to the second connection part moving changing from an upper limit of the second displacement threshold range to an upper limit of the third displacement threshold range, the pneumatic valve controls the air spring to deflate with a preset second gas flow, the height of the air spring being decreased, and meanwhile carries out the gas driving on the damping force adjustment device to control the first damping force output by the adjustable damper to gradually increase with the change of the displacement;

or in a process of the positional relationship of the first connection part relative to the second connection part changing from a lower limit of the second displacement threshold range to a lower limit of the third displacement threshold range, the pneumatic valve controls the air spring to inflate with the second gas flow, the height of the air spring being increased, and meanwhile carries out the gas driving on the damping force adjustment device to control the first damping force output by the adjustable damper to gradually increase with the change of the displacement, wherein the second gas flow is greater than the first gas flow.

7. The method for adjusting height and damping force according to claim 6, wherein the positional relationship of the first connection part relative to the second connection part exceeding the third displacement threshold range, the pneumatic valve controlling the air spring to inflate or deflate and meanwhile carrying out the gas driving on the damping force adjustment device to control the adjustable damper to output a second damping force, comprises:

in a process of the positional relationship of the first connection part relative to the second connection part changing to exceed an upper limit of the third displacement threshold range, the pneumatic valve controls the air spring to deflate with a preset third gas flow, the height of the air spring being decreased, and meanwhile carries out the gas driving on the damping force adjustment device to control the second damping force output by the adjustable damper;

in a process of the positional relationship of the first connection part relative to the second connection part changing to exceed a lower limit of the third displacement threshold range, the pneumatic valve controls the air spring to inflate with the third gas flow, the height of the air spring being increased, and meanwhile carries out the gas driving on the damping force adjustment device to control the second damping force output by the adjustable damper, wherein the third gas flow is greater than the second gas flow.

8. The method for adjusting height and damping force according to claim 1, wherein the method further comprises:
controlling the working stroke of the pneumatic valve to be shortened, lengthened or remain unchanged by a height adjustment device, so as to control the air spring to inflate, deflate or neither inflate nor deflate, to realize shift and memory adjustment of the positional relationship of the first connection part relative to the second connection part.

9. The method for adjusting height and damping force according to claim 8, wherein a balance position of the first connection part relative to the second connection part changes with the change of the positional relationship of the first connection part relative to the second connection part, and the pneumatic valve enables the first connection part or the second connection part to suspend at the balance position of the first connection part relative to the second connection part.

10. A system for adjusting height and damping force, wherein the system comprises a first connection part, a second connection part, at least one pneumatic valve, an air spring, an adjustable damper and a damping force adjustment device configured to adjust the damping force of the adjustable damper; the pneumatic valve, the air spring, the adjustable damper and the damping force adjustment device is arranged between a first connection part and a second connection part; the positions of the pneumatic valve, the air spring, the adjustable damper and the damping force adjustment device fit with each other; and the pneumatic valve is connected to the damping force adjustment device and the air spring, respectively;

the pneumatic valve is configured to collect at least one movement variable of the first connection part relative to the second connection part, and meanwhile, according to at least one of the collected movement variable and change in the movement variable, to control the air spring to inflate or deflate so as to realize height adjustment, and/or carry out gas driving on the damping force adjustment device to control the adjustable damper to output corresponding damping force, so as to realize adjustment of the size of the damping force of the adjustable damper;

wherein at least one movement variable comprises a positional relationship of the first connection part relative to the second connection part, and the positional relationship comprises at least one of a vertical relationship and/or a horizontal relationship;

the positional relationship of the first connection part relative to the second connection part being a target value for adjustment, and the positional relationship being provided by the total working stroke of the pneumatic valve, and the total working stroke including a total working stroke balance position and at least three displacement threshold ranges, wherein a second displacement threshold range contains a first displacement threshold range, and a third displacement threshold range contains the second displacement threshold range;

the positional relationship of the first connection part relative to the second connection part being within the first displacement threshold range, the pneumatic valve being configured to neither control the air spring to inflate or deflate nor to carry out the gas driving on the damping force adjustment device to control the adjustable damper to output a corresponding damping force, and the damping force of the adjustable damper being a preset basic damping force;

the positional relationship of the first connection part relative to the second connection part being between the first displacement threshold range and the second displacement threshold range, the pneumatic valve being configured to control the air spring to inflate or deflate, but not to carry out the gas driving on the damping force adjustment device to control the adjustable damper to output a corresponding damping force, and the damping force of the adjustable damper being a preset damping force;

the positional relationship of the first connection part relative to the second connection part being between the second displacement threshold range and the third displacement threshold range, the pneumatic valve being configured to control the air spring to inflate or deflate, and meanwhile carry out the gas driving on the damping force adjustment device to control the adjustable damper to output a first damping force, and the first damping force changing with the change of displacement;

the positional relationship of the first connection part relative to the second connection part exceeding the third displacement threshold range, and the pneumatic valve being configured to control the air spring to inflate or deflate and meanwhile carry out the gas driving on the damping force adjustment device to control the adjustable damper to output a second damping force;

wherein the second damping force is a damping force corresponding to an terminal impact protection coefficient, and the first damping force is located between the preset basic damping force and the second damping force.

11. The system for adjusting height and damping force according to claim 10,
wherein the pneumatic valve is further configured to collect a velocity and an acceleration of the first connection part relative to the second connection part, wherein the velocity is determined by at least two temporally consecutive positions of the first connection part relative to the second connection part, and the acceleration is determined by at least two temporally consecutive velocities of the first connection part relative to the second connection part.

12. The system for adjusting height and damping force according to claim 11, wherein when the positional relationship of the first connection part relative to the second connection part is within the second displacement threshold range, and the acceleration of the first connection part relative to the second connection part is greater than an acceleration threshold, the adjustable damper is controlled to output a third damping force, the third damping force decreasing with the increase of the acceleration, or the third damping force increasing with the decrease of the acceleration, wherein the third damping force is smaller than the preset basic damping force.

13. The system for adjusting height and damping force according to claim 10, wherein the damping force adjustment device is configured to, after the adjustable damper outputs the second damping force, control its own air pressure to reduce within a preset time, so that the second damping force output by the adjustable damper is not changed within the preset time to realize time delay adjustment of the damping force of the adjustable damper.

14. The system for adjusting height and damping force according to claim 10, wherein, the pneumatic valve is configured to, in a process of the positional relationship of the first connection part relative to the second connection part changing from an upper limit of the first displacement threshold range to an upper limit of the second displacement threshold range, control the air spring to deflate with a preset first gas flow, the height of the air spring being decreased, and meanwhile the damping force of the adjustable damper being a preset basic damping force;

or the pneumatic valve is configured to, in a process of the positional relationship of the first connection part relative to the second connection part changing from a lower limit of the first displacement threshold range to a lower limit of the second displacement threshold range, control the air spring to inflate with the preset first gas flow, the height of the air spring being increased, and meanwhile the damping force of the adjustable damper being the preset basic damping force.

15. The system for adjusting height and damping force according to claim 14, wherein, the pneumatic valve is configured to, in a process of the positional relationship of the first connection part relative to the second connection part moving changing from an upper limit of the second displacement threshold range to an upper limit of the third displacement threshold range, control the air spring to deflate with a preset second gas flow, the height of the air spring being decreased, and meanwhile to carry out the gas driving on the damping force adjustment device to control the first damping force output by the adjustable damper to gradually increase with the change of the displacement;

or the pneumatic valve is configured to, in a process of the positional relationship of the first connection part relative to the second connection part changing from a lower limit of the second displacement threshold range to a lower limit of the third displacement threshold range, control the air spring to inflate with the second gas flow, the height of the air spring being increased, and meanwhile to carry out the gas driving on the damping force adjustment device to control the first damping force output by the adjustable damper to gradually increase with the change of the displacement, wherein the second gas flow is greater than the first gas flow.

16. The system for adjusting height and damping force according to claim 15, wherein, the pneumatic valve is configured to, in a process of the positional relationship of the first connection part relative to the second connection part changing to exceed an upper limit of the third displacement threshold range, control the air spring to deflate with a preset third gas flow, the height of the air spring being decreased, and meanwhile to carry out the gas driving on the damping force adjustment device to control the second damping force output by the adjustable damper;

the pneumatic valve is configured to, in a process of the positional relationship of the first connection part relative to the second connection part changing to exceed a lower limit of the third displacement threshold range, control the air spring to inflate with the third gas flow, the height of the air spring being increased, and meanwhile to carry out the gas driving on the damping force adjustment device to control the second damping force output by the adjustable damper, wherein the third gas flow is greater than the second gas flow.

17. The system for adjusting height and damping force according to claim 10, wherein the system further comprises:

a height adjustment device being configured to control the working stroke of the pneumatic valve to be shortened, lengthened or remain unchanged, so as to control the air spring to inflate, deflate or neither inflate nor deflate, to realize shift and memory adjustment of the positional relationship of the first connection part relative to the second connection part.

18. The system for adjusting height and damping force according to claim 17, wherein balance position of the first connection part relative to the second connection part changes with the change of the positional relationship of the first connection part relative to the second connection part, and the pneumatic valve enables the first connection part or the second connection part to suspend at the balance position of the first connection part relative to the second connection part.

19. The system for adjusting height and damping force according to claim 10, wherein the damping force adjustment device comprises a gas compression device and a cable control device driven by the gas compression device, the cable control device being connected with the adjustable damper;

the pneumatic valve is configured to carry out the gas driving on a state quantity of gas information inside the gas compression device and a frequency of change of the state quantity according to the collected movement variable and/or the change of the movement variable, so as to change the size of the stroke of the gas compression device to adjust matching relationship between a driving force and a returning force of the cable control device and to drive an adjustment pin of the adjustable damper to swing back and forth, realizing adaptive adjustment of the damping force of the adjustable damper.

20. The system for adjusting height and damping force according to claim 10, wherein the damping force adjustment device comprises a gas compression device driven by the pneumatic valve, the gas compression device being connected with the adjustable damper;

the pneumatic valve is configured to adjust the size of the stroke of the gas compression device by the gas driving according to the collected movement variable and/or the change of the movement variable, to drive an adjustment pin of the adjustable damper to swing back and forth by a corresponding amplitude, and to realize adaptive adjustment of the damping force of the adjustable damper.

21. The system for adjusting height and damping force according to claim 10, wherein the damping force adjustment device comprises a proportional valve, the proportional valve being connected with a valve port of a damping fluid flow chamber of the adjustable damper;

the pneumatic valve is configured to change the working stroke of the proportional valve by the gas driving according to the collected movement variable and/or the changes of the movement variable, thereby controlling the size of the flow path of the valve port of the damping fluid flow chamber of the adjustable damper, so as to adjust damping fluid flow and/or flow rate of the adjustable damper, to realize adaptive adjustment of the damping force of the adjustable damper.

* * * * *

UNITED STATES PATENT AND TRADEMARK OFFICE
CERTIFICATE OF CORRECTION

| | | |
|---|---|---|
| PATENT NO. | : 11,926,188 B2 | Page 1 of 1 |
| APPLICATION NO. | : 17/769857 | |
| DATED | : March 12, 2024 | |
| INVENTOR(S) | : Xiaofeng Zhang et al. | |

It is certified that error appears in the above-identified patent and that said Letters Patent is hereby corrected as shown below:

On the Title Page

Item [72], The order of the Inventors should read as follows:
Xiaofeng Zhang; Guo Sun; Jia Zhang; Yongjiang Feng; Manhua Yu.

Signed and Sealed this
Thirty-first Day of December, 2024

Derrick Brent
*Acting Director of the United States Patent and Trademark Office*